United States Patent
Greenberg

(10) Patent No.: US 11,709,234 B2
(45) Date of Patent: Jul. 25, 2023

(54) SYSTEM AND METHOD FOR NON-ITERATIVELY GENERATING CYCLICALLY OPTIMAL WAVEFORMS

(71) Applicant: RAYTHEON COMPANY, Waltham, MA (US)

(72) Inventor: Adam Hodge Greenberg, Los Angeles, CA (US)

(73) Assignee: RAYTHEON COMPANY, Waltham, MA (US)

(*) Notice: Subject to any disclaimer, the term of this patent is extended or adjusted under 35 U.S.C. 154(b) by 602 days.

(21) Appl. No.: 16/863,744

(22) Filed: Apr. 30, 2020

(65) Prior Publication Data
US 2021/0341577 A1 Nov. 4, 2021

(51) Int. Cl.
*G01S 7/484* (2006.01)
(52) U.S. Cl.
CPC .................. *G01S 7/484* (2013.01)
(58) Field of Classification Search
CPC ......... G01S 7/484; G01S 17/10; H04L 25/49; H04L 25/4902
See application file for complete search history.

(56) References Cited

U.S. PATENT DOCUMENTS

| | | |
|---|---|---|
| 4,527,276 A | 7/1985 | Gutleber |
| 9,858,304 B2 | 1/2018 | Marcus et al. |

(Continued)

FOREIGN PATENT DOCUMENTS

| | | |
|---|---|---|
| CN | 104730535 A | 6/2015 |
| CN | 104168066 B | 8/2016 |

(Continued)

OTHER PUBLICATIONS

Peter Rieger, Andreas Ullrich, "Resolving range ambiguities in high-repetition rate airborne lidar applications," Proc. SPIE 8186, Electro-Optical Remote Sensing, Photonic Technologies, and Applications V, 81860A (Oct. 5, 2011); (Year: 2011).*

(Continued)

*Primary Examiner* — Isam A Alsomiri
*Assistant Examiner* — Joseph C Fritchman
(74) *Attorney, Agent, or Firm* — Lewis Roca Rothgerber Christie LLP

(57) ABSTRACT

A lidar for generating a cyclically optimal Pulse Position Modulated (PPM) waveform includes: a memory for storing a list of prime numbers; a processor for obtaining a list of prime numbers up to a predetermined maximum code length; selecting a largest prime number p* that is less than or equal to a ratio of a timing system bandwidth to the predetermined pulse repetition frequency (PRF), from the list of the prime numbers; constructing a list of pulse indices, m=0: p*−1 for the cyclically optimal PPM waveform; calculating a list of pulse modulations, dJs=mod($m^2$, p*)−(p*−1)/2, wherein dJs are modulation values; calculating a list of nominal pulse timings T, as T=m×ceil($T_{PRI}$/Δj), where Δj is a predetermined modulation resolution, and $T_{PRI}$ is the reciprocal of the PRF; calculating pulse timings $t^0$ of the cyclically optimal PPM waveform as $t^0$=Δj×(T+dJs); and generating the cyclically optimal PPM waveform from the pulse timings $t^0$.

12 Claims, 4 Drawing Sheets

(56) References Cited

U.S. PATENT DOCUMENTS

| | | | | |
|---|---|---|---|---|
| 2003/0099280 | A1* | 5/2003 | Kumar | H04J 13/00 375/130 |
| 2015/0070683 | A1* | 3/2015 | Lepere | G01S 17/10 356/5.01 |
| 2017/0329010 | A1 | 11/2017 | Warke et al. | |
| 2021/0124050 | A1* | 4/2021 | Puglia | G01S 17/10 |

FOREIGN PATENT DOCUMENTS

| | | |
|---|---|---|
| EP | 1 884 800 A1 | 2/2008 |
| EP | 2 694 996 A1 | 2/2014 |

OTHER PUBLICATIONS

Gunzung Kim, et al. "Suitable Combination of Direct Intensity Modulation and Spreading Sequence for LIDAR with Pulse Coding", Sensors, vol. 18, No. 12, Nov. 30, 2018 (pp. 1-22).

International Search Report for related International Application No. PCT/US2020/066481, filed Dec. 21, 2020, International Search Report dated Mar. 23, 2021 and dated Apr. 1, 2021 (5 pgs.).

Written Opinion of the International Searching Authority for related International Application No. PCT/US2020/066481, filed Dec. 21, 2020, Written Opinion of the International Searching Authority dated Apr. 1, 2021 (5 pgs.).

International Search Report for related International Application No. PCT/US2020/066666, filed Dec. 22, 2020, International Search Report dated Mar. 25, 2021 and dated Apr. 6, 2021 (4 pgs.).

Written Opinion of the International Searching Authority for related International Application No. PCT/US2020/066666, filed Dec. 22, 2020, Written Opinion of the International Searching Authority dated Apr. 6, 2021 (6 pgs.).

International Search Report from related International Application No. PCT/US2021/028247, filed Apr. 20, 2021, International Search Report dated Jul. 2, 2021 and dated Jul. 13, 2021 (4 pgs.).

Written Opinion of the International Searching Authority from related International Application No. PCT/US2021/028247, filed Apr. 20, 2021, Written Opinion of the International Searching Authority dated Jul. 13, 2021 (7 pgs.).

Bansal, S., et al., "Nature-inspired metaheuristic algorithms to find near-OGR sequences for WDM channel allocation and their performance comparison," Opten Math. 2017; 15:520-547.

Dimitromanolakis, A., "Analysis of the Golomb Ruler and the Sidon Set Problems, and Determination of Large, Near-Optimal Golomb Rulers," Department of Electronic and Computer Engineering Technical University of Crete, Jun. 2002, 118 pages.

Erdos, P., et al., "On a Problem of Sidon in Additive Number Theory, and on Some Related Problems," Journal of the London Mathematical Society, vol. 16, 1941, 4 pages.

Fluckiger, D.U. et al., "Optimal pseudorandom pulse position modulation ladar waveforms," Applied Optics, Mar. 20, 2015, vol. 54, No. 9, 4 pages.

Gagliardi, R., et al., "Acquisition Sequences in PPM Communications", IEEE Transactions on Information Theory, vol. IT-33, No. 5, Sep. 1987, 7 Pages.

Hiskett, P.A., et al., "A photon-counting time-of-flight ranging technique developed for the avoidance of range ambiguity at gigahertz clock rates," Optics Express. Sep. 1, 2008, vol. 16, No. 18, 14 pages.

Mao, X., et al., "Pulse position modulation for compact all-fiber vehicle laser rangefinder development," OpticalEngineering. SPIEDigitalLibrary.org, 56(10), Oct. 2017, 9 pages.

Milstein, A.B., et al., "Acquisition algorithm for direct-detection ladars with Geiger-mode avalanche photodiodes," Applied Optics, vol. 47, No. 2, Jan. 10, 2008, 16 pages.

\* cited by examiner

SYSTEM AND METHOD FOR NON-ITERATIVELY GENERATING CYCLICALLY OPTIMAL WAVEFORMS

FIELD OF THE INVENTION

The disclosed invention relates generally to lidars; and more particularly to system and method for non-iteratively generating cyclically optimal Pulse Position Modulated (PPM) waveforms.

BACKGROUND

Pulsed laser radar sensors, also known as lidars or ladars, are active sensing systems that determine the range to a target by measuring the time of flight of short laser pulses reflected off the target. A lidar system generally includes three primary subsystems: a laser transmitter, an optical receiver, and a processor. The transmitter is capable of generating laser pulses when commanded, and of directing these pulses in the direction of the target. A key characteristic of these pulses is that they are each 1-25 nanoseconds in duration, so that the resulting range measurement may be accurate to within a few meters.

The receiver includes an optical system capable of collecting light reflected from the target, and a photodetector that can record the arrival of reflected light. The photodetector is capable of timing the arrival of return pulses with an accuracy similar in scale to the laser pulse duration. The processor is configured to control the operation of the transmitter and receiver, and to extract information about the target from the detections made by the receiver. The processor is also capable of synchronizing the commands issued to the transmitter and the receiver. An essential aspect of the return processing is the ability to determine target characteristics accurately despite complex scattering of the transmitted light, imperfect detection of the returns, unwanted detections due to ambient light and electrical noise, and modulation of the return due to target motion, among other practical complications.

In common operational conditions, the target return from a single transmitted pulse is not sufficient for target detection, and multiple pulses must be used. As is well-known in the art, the pulse waveform, or sequence of times at which pulses are transmitted, needs to be selected carefully to allow unambiguous interpretation of the returns. If pulses are widely spaced, it may be straightforward to associate specific returns with their corresponding transmit pulses, but the integration (or dwell) time required to transmit and receive a sufficient number of pulses may be excessive. If pulses are repeated at higher frequency, the integration time decreases, but the time of flight calculation may become ambiguous.

Some problems of range ambiguity can be solved with the use of waveforms that apply some type of encoding to each pulse. One such encoding generates pulse position modulated (PPM) waveforms. PPM encodes waveforms by modulating the position of each outgoing pulse with respect to some nominal underlying position. This underlying position is determined by the pulse number divided by the waveform's nominal Pulse Repetition Frequency (PRF). PPM encoding works adequately in some cases, but current methods of constructing these waveforms are computationally intensive and limited in applicability.

The conventional technique for determining time of flight from an extended pulsed waveform is to compute the cross-correlation between the transmit waveform and a set of recorded photodetection times. However, this method is limited to post-collection processing, which limits the speed at which range estimates may be determined. Furthermore, this method does not account for waveform compression or stretching due to target motion.

In general, a good quality waveform tends to maximize the length of the waveform and minimize the height of the sidelobes of the original base code. Because of this, one metric for determining waveform quality is the peak-to-maximum-sidelobe-ratio (PMSLR). Many of the current approaches for generating a good quality waveform use an iterative process to calculate the PPM elements. The iterative process is complex and takes a large amount of computational time.

SUMMARY

In some embodiments, the disclosed invention is a method for determining a range to a target by generating a cyclically optimal pulse position modulated (PPM) waveform in a lidar, the PPM waveform having a predetermined maximum code length and a predetermined pulse repetition frequency (PRF). The method includes: obtaining a list of prime numbers up to the predetermined maximum code length; selecting a largest prime number $p^*$ that is less than or equal to the ratio of a timing system bandwidth to the predetermined PRF, from the list of the prime numbers; constructing a list of pulse indices, $m=0:p^*-1$ for the cyclically optimal PPM waveform; and calculating a list of pulse modulations, $dJs=\mod(m^2, p^*)-(p^*-1)/2$, where $dJs$ are modulation values; calculating a list of nominal pulse timings T, as $T=m\times\mathrm{ceil}(T_{PRI}/\Delta j)$, where $\Delta j$ is a predetermined modulation resolution, and $T_{PRI}$ is the reciprocal of the PRF, which is equal to the reciprocal of the PRF. The method further includes: calculating pulse timings $t^0$ of the cyclically optimal PPM waveform as $t^0=\Delta j\times(T+dJs)$; generating the cyclically optimal PPM waveform from the pulse timings $t^0$; and transmitting the cyclically optimal PPM waveform, by the lidar toward the target to determine the range to the target.

In some embodiments, the disclosed invention is a lidar for determining a range to a target by generating a cyclically optimal PPM waveform, the PPM waveform having a predetermined maximum code length and a predetermined PRF. The lidar includes: a memory for storing a list of prime numbers up to the predetermined maximum code length; a processor for obtaining a list of prime numbers up to the predetermined maximum code length; selecting a largest prime number $p^*$ that is less than or equal to a ratio of a timing system bandwidth to the predetermined PRF, from the list of the prime numbers; constructing a list of pulse indices, $m=0: p^*-1$ for the cyclically optimal PPM waveform; calculating a list of pulse modulations, $dJs=\mod(m^2, p^*)-(p^*-1)/2$, wherein $dJs$ are modulation values; calculating a list of nominal pulse timings T, as $T=m\times\mathrm{ceil}(T_{PRI}/\Delta j)$, where $\Delta j$ is a predetermined modulation resolution, and $T_{PRI}$ is the reciprocal of the PRF; calculating pulse timings $t^0$ of the cyclically optimal PPM waveform as $t^0=\Delta j\times+dJs)$; and generating the cyclically optimal PPM waveform from the pulse timings $t^0$; a transmitter for transmitting the cyclically optimal PPM waveform toward the target; and a receiver for receiving a waveform reflected from the target to determine the range to the target.

The generated cyclically optimal PPM waveform is free of any baud collision, which occurs when there exist two or more pairs of pulses with shared differences. In some embodiments, the ratio of a timing system bandwidth to the predetermined PRF is calculated by $$2f_j \frac{T_{PRI}}{\Delta j},$$

where $f_j$ is a hardware-constrained maximum modulation fraction. Furthermore, the generated waveform can be repeated head-to-tail without any degradation in PMSLR.

BRIEF DESCRIPTION OF THE DRAWINGS

These and other features, aspects, and advantages of the disclosed invention will become better understood with regard to the following description, appended claims, and accompanying drawings.

DETAIL DESCRIPTION

Figure 1A:
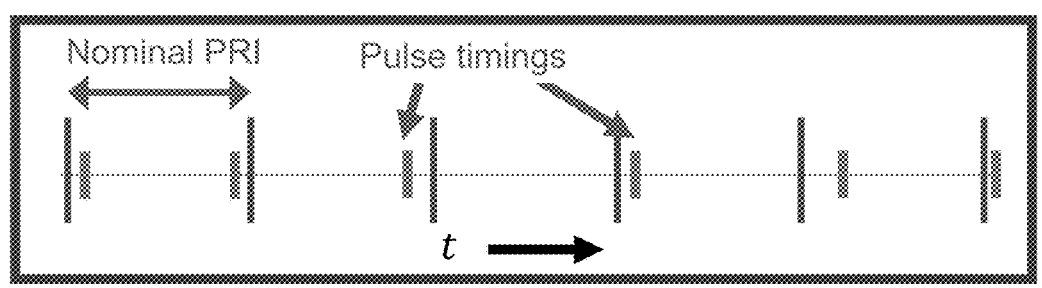
FIG. 1A shows a typical PPM waveform.
Figure 1B:
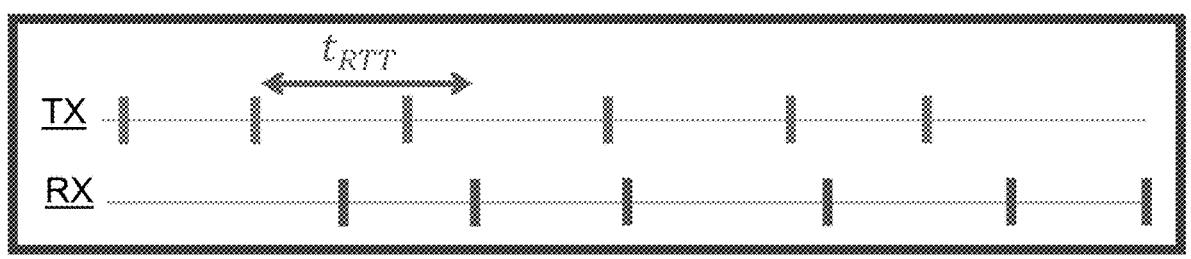
FIG. 1B depicts a typical range determination from the PPM waveform of FIG. 1A.

In some embodiments, the disclosed invention uses a closed-form expression to directly compute an entire PPM code for lidar waveform generation, in a non-iterative manner. The resulting PPM code is cyclically optimal. Cyclically optimal waveforms have the property that they can be indefinitely repeated, head-to-tail, while maintaining the peak-to-maximum-sidelobe-ratio (PMSLR) of the original base code. PMSLR serves as a metric for waveform quality, therefore, the quality of cyclically optimal waveforms does not degrade over time. Furthermore, it can be shown that a cyclically optimal waveform of length N has the best possible PMSLR after self-concatenation, as compared to any code of length N after self-concatenation. In some embodiments, the disclosed invention leverages previous work done on Golomb rulers, with some modifications, to construct a waveform for which the baud collision condition is never true.

In some embodiments, the approach of the present invention is able to generate codes very fast. For example, it is able to generate a 10,000 element PPM code in under 10 ms. The length of the code generated is linearly proportional to the size of the modulation pool, which describes the pool of available pulse modulations that are supported by the hardware.

In some embodiments, the disclosed invention leverages analysis done within the field of number theory, for example, Sidon sequences, Golomb sequences or Golomb rulers. The disclosed invention defines an analytic expression that can be used to directly construct a Sidon sequence, and uses this expression as the basis of a computer-executed process to generate similar sequences that can be used for unambiguous target ranging with lidar systems. This process is very fast (O(N)), and can generate long cyclically optimal lidar PPM waveforms very quickly (e.g., 10 k elements in ~10 ms).

A simple relationship for a waveform of length (N) is derived from the ratio of the operational pulse repetition frequency (PRF), and the bandwidth of the laser timing system, $B\_T=(m/(2f))\hat{} -1$, where m is the minimum modulation resolution of the laser and f is the maximum modulation expressed as a fraction of a pulse repetition interval. For instance, with a laser that has a minimum modulation resolution of 1 ns and a maximum modulation fraction of 10%, the timing system bandwidth B_T is equal to 200 MHz and N=(200 MHz)/PRF. The disclosed invention therefore works well for generating waveforms for low PRF (<5 kHz) to high PRF (50 kHz) systems. This non-iterative approach allows for on-the-fly construction of new PPM waveforms. In some embodiments, a cyclically optimal waveform can be initially generated and stored in a memory and then repeatedly used for transmission by the lidar toward a target. Consequently, the disclosed approach simplifies the design of the systems utilizing PPM waveforms for ranging, since a variety of different waveforms can be tested during system design and optionally stored in a memory for use, without spending time on expensive computations.

In some embodiments, the process of the disclosed invention includes a re-derivation of the original Erdos-Turan construction, since the original Erdos-Turan construction cannot be directly applied to lidars because of the built-in hardware limitations that lidars have, especially the laser in the lidar systems. The disclosed invention then uses this re-derivation to show that that construction can be modified to work within the hardware limitations of lasers and lidars. The process of the disclosed invention also provides a second modification to the original Erdos-Turan construction that renders the resulting (PPM) waveforms cyclically optimal. In some embodiments, a cyclically optimal waveform can be initially generated and stored in a memory and then repeatedly used for transmission by the lidar toward a target, with no degradation in waveform quality.

The system and method of the disclosed invention is applicable to and therefore improves upon the following technologies: target detection and tracking, autonomous vehicles, mining, astronomy, robotics, video games, spacecrafts, geology and soil sciences, agriculture (e.g., seed and fertilizer dispersions, sensing techniques, crop scouting), archaeology (e.g., planning of field campaigns, mapping features under forest canopy, and overview of broad, continuous features indistinguishable from the ground) and many others In a context unrelated to laser ranging, sequences with properties similar to optimal waveforms have been previously studied within the field of number theory. For example, a Golomb ruler is a sequence of integers with the property that no two pairs exist with the same difference. We refer to the presence of two pairs of integers in a sequence with the same differences as a baud collision. In other words, baud collisions occur in a code of length N, if there exist two or more pairs of pulses with shared differences. We can then define a Golomb ruler, or equivalently, an optimal PPM waveform, in terms of the baud collision condition: a PPM waveform of length N with timings $t_m$ is optimal iff the condition $t_i-t_j=t_k-t_l$ is never true, for any i,j,k,l<N. That is, no pairs of pulses exist with shared differences.

There is a known method for the construction of Golomb rulers of length N, with integer elements $t_m$, m<N:

$$t_m = 2Nm^2 + m \qquad (1)$$

In order for this sequence to be optimal, the baud collision condition must not hold, i.e., $t_i-t_j=t_k-t_l$ must never be true for any i,j,k,l<N. We can rewrite this condition in terms of sums as $t_i+t_l=t_k+t_j$. Consider an integer, A, equal to the sum of two elements of t, $A:=t_i+t_l=2N(i^2+l^2)+(i+l)$. Via Euclid's division algorithm, we know that A/(2N) can be uniquely expressed as some integer quotient, q, and a remainder, r, such that $$A=2Nq+r, \text{ where } r<2N \qquad (2).$$

Setting these two expressions for A to be equal, we have $$2N(i^2+l^2)+(i+l)=2Nq+r \qquad (3).$$

Here r<2N (by the definition of remainder), and i+l<2N, because i<N and l<N. Therefore, we can see from the previous expression that $q=i^2+l^2$ and r=i+l. This defines a system of equations, which can be solved to give:

$$i=\tfrac{1}{2}\times(r\pm\sqrt{2q-r^2}) \text{ and } l=\tfrac{1}{2}\times(r\mp\sqrt{2q-r^2}) \qquad (4).$$

The actual expressions for i and l are not important, however, the expressions themselves are unique (modulo interchanging i and l) and therefore by the uniqueness of q and r (guaranteed by the division algorithm), we have uniqueness of i and l. In other words, there is only one pair of i and l satisfying the expression $A:=t_i+t_l$, for a particular choice of A. This means that the baud collision condition can never be triggered, and t is optimal.

In principle, we now have an explicit expression for the construction of an optimal waveform—simply define the pulse timings, t, as $t_m=2Nm^2+m$, for m<N (5). Because one can choose any value for N, this allows construction of an arbitrarily long optimal waveform. However, in practice, lidar waveforms have an additional constraint, introduced by the laser, namely, pulse timings cannot stray too far from some underlying nominal PRF (typically $10^4$-$10^6$ Hz). Specifically, we need $$j_{max}:=\max_m|\Delta j(t_m-t_0)-mT_{PRI}|\leq f_jT_{PRI}, \qquad (5)$$

where $T_{PRI}$ is the reciprocal of the PRF, $f_j$ is some hardware-constrained maximum modulation fraction (typically, $f_j\leq 10^{-1}$), and $\Delta j$ is the modulation resolution ($\Delta j\approx 10^0$-$10^2$ ns).

More generally, a nominal PRF can be said to exist if there exists some $T_{PRI}$ and some $f_j<\tfrac{1}{2}$ for which the above expression is true. Yet, because this construction has a linearly increasing pulse separation, it is impossible to define a nominal PRF, and therefore it is not suitable for laser waveform generation.

However, there is another expression (discovered by Erdos and Turan) for the generation of these sequences, by defining an integral sequence, t, where $$t_m=2pm+(m^2)_p \qquad (6)$$

For some odd prime p, where m<p, and $(m^2)_p$ is the remainder of $m^2$ divided by p.

In order for this sequence to be optimal, the baud collision condition must not hold, i.e., $t_i-t_j=t_k-t_l$ must never be true for any i,j,k,l<N. We can rewrite this condition in terms of sums as $t_i+t_l=t_k+t_j$. Consider an integer, A, equal to the sum of two elements of t, $$A:=t_i+t_l=2p(i+l)+(i^2)_p+(l^2)_p. \qquad (7)$$

By the division algorithm we can write A as A=2pq+r, for integral and unique r, q, where r<2p. Therefore, we know $2pq+r=2p(i+l)+(i^2)_p+(l^2)_p$. Using the same reasoning as above, we see that q=i+l and $r=(i^2)_p+(l^2)_p$. Combining these expressions, we find $(r)_p=(2l^2-2ql+q^2)_p$, or equivalently:

$$(2l^2-2ql+q^2-r)_p=0 \qquad (8)$$

By the known finite field polynomial root theorem, this polynomial has at most two solutions. Therefore, because q and r are uniquely determined by choice of A, there is at most one pair of sequence indices, (i,l), that solve the expression $A=t_i+t_l$. This means that baud collisions cannot occur, and the sequence is optimal. These Erdos-Turan sequences are both optimal, and have (on average) linearly increasing pulse times with a constant unitless PRI of 2p. However, we need to be able to control the maximum timing deviation of the laser (in the lidar) relative to the nominal PRI, as dictated by hardware limitations.

The Erdos-Turan construction prescribes the maximum modulation vales as equal to $$\frac{p-1}{2},$$

corresponding to a modulation fraction of $$f_j=\frac{(p-1)/2}{2p}\approx 0.25,$$

while current lasers typically require $f_j\leq 0.1$. As a result, a modification to the original Erdos-Turan construction is introduced to allow for this constraint. Re-examining the proof described above, we can see that the original construction is adjusted to be: $t_m=(2p++(m^2)_p$, where b can be any integer greater than or equal to zero, then the entire proof still holds.

With this modification, the nominal unitless PRI can be seen by inspection to be equal to 2p+b—in other words, $$T_{PRI}=(2p+b)\Delta j \qquad (9)$$

Now, we can return to our laser-induced constraints—namely, that:

$$j_{max}\leq f_jT_{PRI} \qquad (10)$$

If the sequence is shifted down by (p+1)/2, we find that:

$$j_{max}=\frac{p\Delta j}{2} \qquad (11)$$

Plugging this expression for $j_{max}$ into the laser constraints yields:

$$\frac{p\Delta j}{2}\leq f_j(2p+b)\Delta j \qquad (12)$$

Which provides a (hardware) limitation for the integer b as:

$$b\geq\left\lceil p\left(\frac{1}{2f_j}-2\right)\right\rceil \qquad (13)$$

This constraint on b can be combined with the definition of $T_{PRI}$ yields:

$$T_{PRI} \geq \left(2p + \left\lceil p\left(\frac{1}{2f_j} - 2\right)\right\rceil\right)\Delta j \quad (14)$$

However, because $T_{PRI}$ is an input to the system and method of the disclosed invention, Equation (14) is now expressed as a restriction on p $$p \leq \left\lfloor 2f_j \frac{T_{PRI}}{\Delta j} \right\rfloor \quad (15)$$

There is also a separate restriction on n namely it must be a prime number. But as long as p is some prime number less than $$\left\lfloor 2f_j \frac{T_{PRI}}{\Delta j} \right\rfloor,$$

it can be used for the waveform with the desired $T_{PRI}$ and $f_j$. Because it is desired to generate long waveforms (the waveform length is defined as p−1), p is chosen to be as large as possible. To be more explicit about this. p is re-named as p*, and defined as the largest prime that is less than $$\left\lfloor 2f_j \frac{T_{PRI}}{\Delta j} \right\rfloor,$$

which is a system requirement that depends on the system and specific (lidar) applications.

This allows us to define an expression to generate transmit timings, $t=\{t_m\}$, for an optimal PPM waveform, as a function of $T_{PRI}$, $$f_j \leq \frac{1}{4},$$

and $\Delta j$:

$$t_m = \left(\left\lceil \frac{T_{PRI}}{\Delta j}\right\rceil m + (m^2)_{p^*} - \frac{p^*-1}{2}\right)\Delta j$$

where:

$$p^* = \max\left\{p \leq \left\lfloor 2f_j \frac{T_{PRI}}{\Delta j}\right\rfloor,\right.$$

for prime p}

$$m = \{1 \ldots p^*-1\} \quad (16)$$

The first portion of this equation, $$\left(\left\lceil \frac{T_{PRI}}{\Delta j}\right\rceil m \times \Delta j\right),$$

is the nominal pulse timing; and the second portion, $$\left((m^2)_{p^*} - \frac{p^*-1}{2}\right) \times \Delta j,$$

is the modulation value. Therefore, this expression describes a method to generate a set of nominal pulse timings (consistent with a periodic transmit system), and then modify these timings with a set of pulse timing modulations in order to create an optimal PPM waveform.

The second modification, the cyclically optimal characteristic of the generated code, is now explained. A cyclically optimal code can be repeated, head-to-tail, and maintain its PMSLR for any dwell time, as long as the target's round-trip time is less than the extent of the base code. For instance, a cyclically optimal code with 10,000 pulses, with a nominal PRI of 10 microseconds, has a PMSLR of 10,000. This code can be transmitted, head-to-tail, and the PMSLR of the resulting code will never drop below 10,000, as long as the target is known to lie within (10,000 pulses)×(10 microsecond/pulse)×(C/2)=15,000 km (over twice the radius of the Earth) of the observer.

A cyclically optimal code P, of length N, is defined by the following properties: P is optimal, and any new code, P', generated by concatenating copies of P will have the same PMSLR as P for auto-correlation lags that are less than $N \times T_{PRI}$. That is, $$P':=[P\ P \ldots P] \rightarrow PMSLR_{\Delta T < NT_{PRI}}(P')=N \quad (17)$$

As a result, a new code generated by concatenating copies of a cyclically optimal base code of length N has the highest possible PMSLR that can be achieved by concatenating copies of any base code of length N. The utility of cyclically optimal codes is motivated by two competing constraints on PPM code length. Optimal codes have a maximum length that is determined by the size of the modulation pool, which in turn is hardware limited. Link budgets (as a system requirement) may require codes of a minimum length, particularly when the expected signal-to-noise ratio (SNR) is low. More specifically, one may operate the lidar in an environment where a small fraction of the transmitted pulses is expected to generate a detected returning signal. In these situations, one must transmit more pulses to cultivate sufficient signal return photons to detect the target, which requires longer waveforms. Therefore, an optimal code of the length required by the link budget may not always be available, due to a limited modulation pool size.

An equivalent definition of a cyclically optimal code, P, of length N is P is cyclically optimal iff all contiguous segments of length N of the code P'=[P P . . . P] are optimal. With this alternative definition, it's clear that the Erdos-Turan construction is not cyclically optimal. To see this, first note that the modulation value defined by this construction are symmetric about the middle of the code, because $$((p-m)^2)_p - (m^2)_p = (2pm+p^2)_p = 0 \quad (18)$$

Next, observe that there is a point in the middle of the code that has two adjacent elements separated by exactly the nominal PRI, 2p. This can be seen by checking that $$2p = t_{m+1} - t_m = 2p + (((m+1)^2)_p - (m^2)_p) \quad (19)$$

has a solution at m=(p−1)/2.

Combining these two observations, we can see that if this code were repeated head-to-tail, there would be two elements separated by exactly 2p at m=(p−1)/2, and another pair of elements separated by exactly 2p at m=p (where the head of the repeated code touches against the tail of the first code). Because the base code has a length of N=p−1, there would be at least two pairs of differences that are equal within a contiguous segment with length N, meaning that the code is not cyclically optimal.

However, the following derivation provides that cyclically optimal codes can be generated, with a small modification to this construction.

First, we apply an adjustment to the original Erdos-Turan construction, by introducing an additional parameter, d:

$$t_m(d)=2pm+((m+d)^2)_p, \text{for } m,d \in N, m<p \quad (20)$$

When d=0, this construction is identical to the original one. The variable d can be thought of as a delay parameter. While variable d does not directly have physical significance, it is used in the following proof to demonstrate how the original construction can be modified to generate cyclically optimal codes.

Referring back to the proof of optimality for the original construction (see Equation (5)), we note that adding this additional variable d has the effect of changing $(2l^2-2ql+q^2-r)_p=0$ to $$(2l^2+2l(q-d)+q^2+d(q+2d)-r)_p=0 \quad (21)$$

The same reasoning can now be applied to this expression as was used for the rest of the original proof, namely, using the fact that this quadratic of l can have at most two solutions. Therefore, this modified Erdos-Turan construction, t(d), is optimal for any d.

Now, note that if we append a zero-term to the start of t(d), the resulting code is still optimal—i.e., $t_m^0(d)=2pm++d)^2)_p$, for d∈N, m∈N₀, m<p is optimal.

Furthermore, with this additional zero element, $t^0(d)$ is now equivalent to a cyclical permutation of $t^0(0)$, by d elements. Therefore, every possible contiguous set of p−1 elements within a code generated by concatenated copies of $t^0(0)$ can be reproduced with some choice of d. More specifically, the contiguous sequence of elements from m=m₀ to m=m₀+p−1 of the code [t⁰(d=0), t⁰(d=0), t⁰(d=0), . . . ] is equal to the sequence t⁰(d=m₀).

However, we have already proved that $t^0(d)$ is optimal for any d. Therefore, $t^0(0)$ is cyclically optimal. Consequently, adding an m=0 term to the beginning of the Erdos-Turan construction renders it cyclically optimal.

Figure 3A:
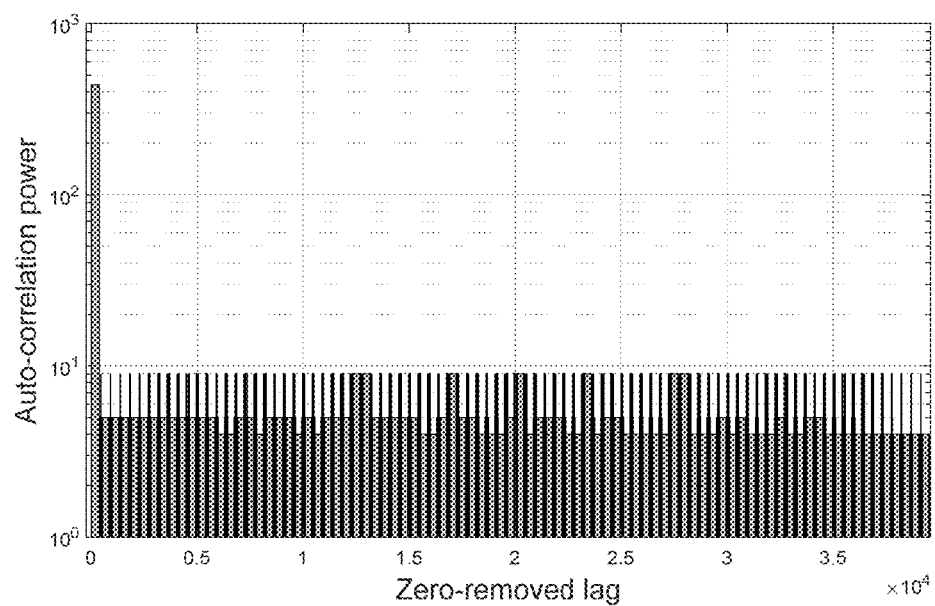
FIGS. 3A and 3B show comparative autocorrelation of five repeated copies for two different codes, the first being non-cyclically optimal, the second being cyclically optimal, according to some embodiments of the disclosed invention.
Figure 3B:
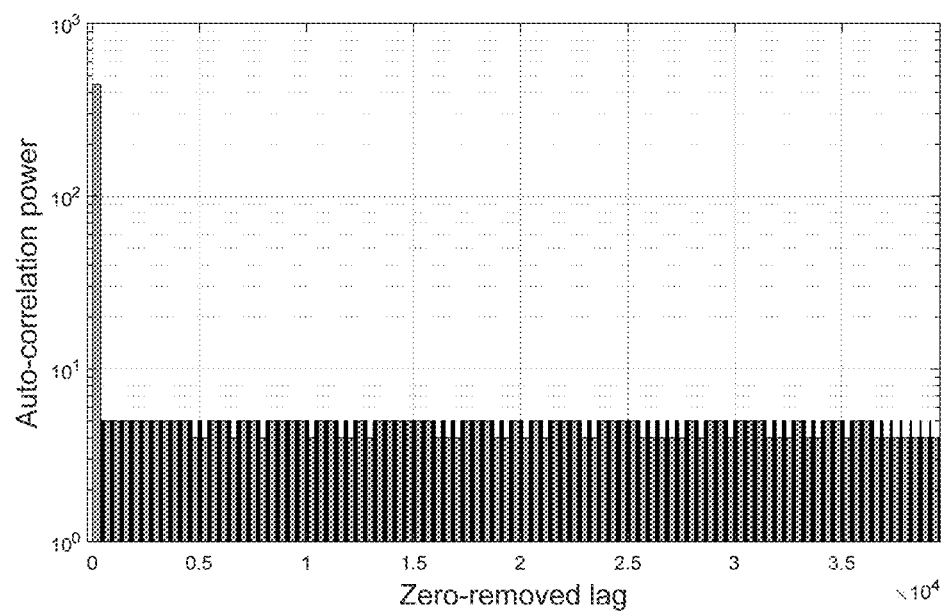

This result is shown experimentally, in FIGS. 3A and 3B. FIG. 3A shows the autocorrelation of five repeated copies of the original Erdos-Turan code, t, for N=89−1, up to lags of N PRIs. FIG. 3B shows the same plot, but for this modified construction, t⁰, with N=89. As shown, the PMSLR of FIG. 3B is 49, while the PMSLR of FIG. 3A is 89, which is much higher than the PMSLR of 49.

In summary, we have shown that a result from the number theory can be used to generate optimal pulse-position modulation waveforms. More specifically, we have applied two modifications to the original Erdos-Turan construction:

$$t_m=2pm+(m^2)_p, \text{for } 1 \le m \le p, p \text{ prime} \quad (22),$$

yielding:

$$t_m = \left(\left\lceil \frac{T_{PRI}}{\Delta j} \right\rceil m + (m^2)_{p^*} - \frac{p^*-1}{2}\right) \Delta j$$

where:

$$p^* = \max\left\{p \le \left\lfloor 2f_j \frac{T_{PRI}}{\Delta j} \right\rfloor\right\},$$

for prime p}

$$m=\{0 \ldots p^*-1\} \quad (23)$$

for input PRI of $T_{PRI}$, modulation resolution $\Delta j$, and maximum jitter fraction $f_j \le \frac{1}{4}$. The resulting construction yields cyclically optimal timings suitable for determining pulsed laser transmit scheduling.

We now turn to describing an exemplary system (FIG. 2) and process flow (FIG. 4) for non-iteratively generating cyclically optimal Pulse Position Modulated (PPM) waveforms.

Figure 2:
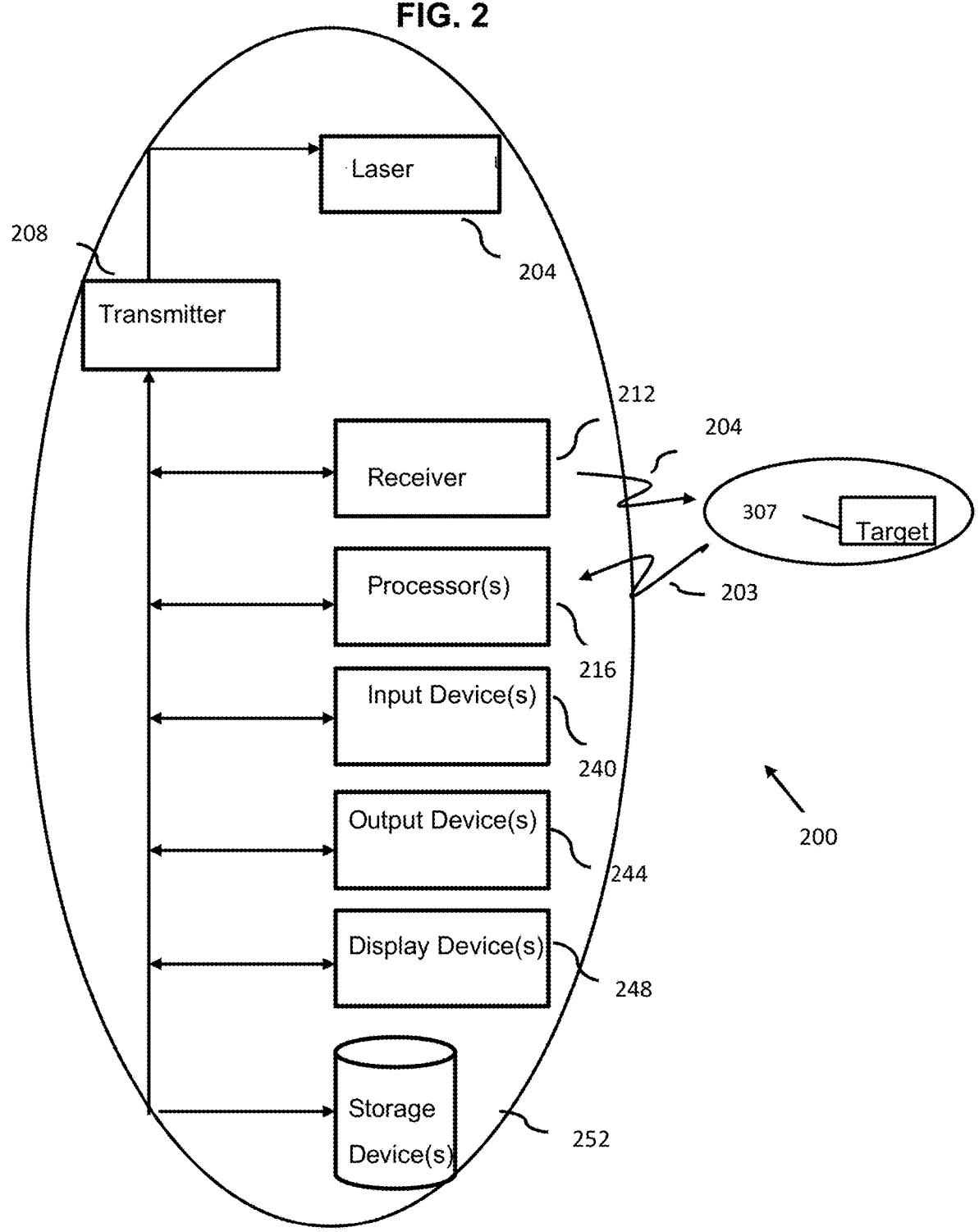
FIG. 2 is a system block diagram of an exemplary lidar system, according to some embodiments of the disclosed invention.

FIG. 2 is a system block diagram of an exemplary lidar system 200, according to some embodiments of the disclosed invention. As shown, a lidar platform includes a laser 204, a transmitter 208 and receiver 212. The transmitter 208 sends lidar transmission pulses 224 towards one or more targets 207 within a region of interest. lidar return pulses (samples) 203 are generated in response to the lidar transmission pulses reflecting off of a plurality of objects (targets) within the region of interest. In some embodiments, the echo from each target (as seen at the receiver) is a version of the transmitted signal that is 1) time delayed by the transit time from transmitter to target to receiver, 2) might be frequency shifted due to target motion, and 3) attenuated by some factor. The receiver observes a return signal consisting of each of the target echoes (plus random noise).

System 200 also includes one or more input devices 240, one or more output devices 244, one or more display devices 248, one or more processors 216, and one or more storage devices 252. The modules and devices described herein can, for example, utilize the one or more processors 216 to execute computer executable instructions and/or the modules and devices described herein and may include their own processor to execute computer executable instructions. As known in the art, the one or more processors 216 include their own memories, such as RAMs and ROMs to store and execute program instructions. One skilled in the art would understand that the system 200 can include, for example, other modules, devices, and/or processors known in the art and/or varieties of the described modules, devices, analog-to-digital converters (ADCs), digital-to-analog converters (DACs), and/or processors.

The input devices 240 receive information from a user (not shown) and/or another computing system (not shown). The input devices 240 can include, for example, Bluetooth interface, WiFi interface, network interface, a keyboard, a scanner, a microphone, a stylus, a touch sensitive pad or display. The output devices 244 output information associated with the system 200 (e.g., information to remote devices, information to a speaker, information to a display, for example, graphical representations of information). The processors 216 execute instructions for the system (e.g., applications). The storage devices 252 store a variety of information/data, including lidar range data generated by the system 200 and prior CPIs. The display devices 248 display information associated with the system 200, for example, target information including their position, distance, type and the like, status information, configuration information and the like. The storage devices 252 can include, for example, long-term storage, such as a hard drive, a tape storage device, or flash memory; short-term storage, such as a random-access memory, or a graphics memory; and/or any other type of computer readable storage. In some embodiments, the process according to the disclosed invention is performed by the processor(s) 216, utilizing some or all of the components illustrated in FIG. 2.

Figure 4:
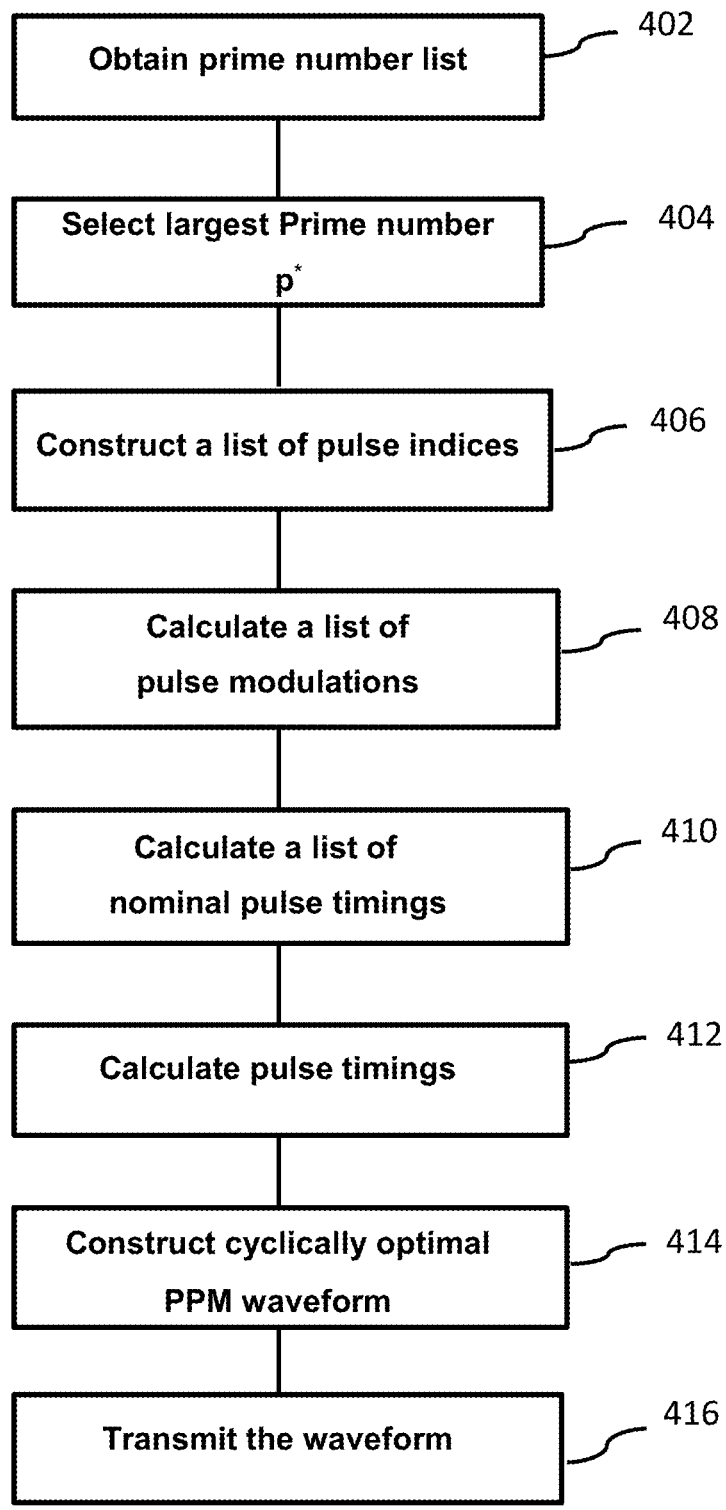
FIG. 4 is an exemplary process flow block diagram for generating cyclically optimal PPM waveforms, according to some embodiments of the disclosed invention.

FIG. 4 is an exemplary process flow block diagram for generating cyclically optimal PPM waveforms, according to some embodiments of the disclosed invention. In some embodiments, the process starts with obtaining a list of prime numbers up to the potential maximum desired code length, in block 402. The list maybe pre-generated and stored in a memory for access by the process(s) executing the process of the disclosed invention. The processor(s) may access an already generated list of the prime numbers that is stored in a memory. In some embodiments, the process takes as input a desired PRI, $T_{PRI}$, a modulation resolution $\Delta j$, and a maximum modulation fraction $f_j$.

In block 404, the largest prime number p* that is less than or equal to a ratio of the timing system bandwidth to the desired PRI (a system requirement) is selected from the list of the prime numbers. In some embodiments, this ratio is calculated by $$2f_j \frac{T_{PRI}}{\Delta j}.$$

In block 406, a list of pulse indices, m=0:p*−1 is generated. A list of pulse modulations, dJs=mod(m², p*)−(p*−1)/2 is then constructed in block 408. dJs are the modulation values that are defined by $T_{PRI}$ as a system parameter. In Block 410, a list of nominal pulse timings T is calculated as T=m×ceil ($T_{PRI}/\Delta j$). These timings correspond to what the transmit schedule would be, if the system were operated periodically. In block 412, the pulse timings $t^0$ of the PPM waveform are calculated by $t^0=\Delta j\times(T+dJs)$. In block 414, a (cyclically optimal) PPM waveform is constructed from the pulse timings $t^0$, and the waveform is transmitted by the lidar toward t target, in block 416. This process can generate very long cyclically optimal codes, very quickly. For example, with $T_{PRI}=(20\ kHz)^{-1}$, $\Delta j=1$ ns, =0.1, this process constructs a 10,000-element code in less than 10 ms. This way, the generated waveform can be repeated head-to-tail without any degradation in PMSLR.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended drawings and claims.

What is claimed is:

1. A method for determining a range to a target by generating a cyclically optimal Pulse Position Modulated (PPM) waveform in a lidar, the PPM waveform having a predetermined maximum code length and a predetermined pulse repetition frequency (PRF), the method comprising:
    obtaining a list of prime numbers up to the predetermined maximum code length;
    selecting a largest odd prime number p* that is less than or equal to the ratio of a timing system bandwidth to the predetermined PRF, from the list of the prime numbers;
    constructing a list of pulse indices, m=0: p* −1 for the cyclically optimal PPM waveform;
    calculating a list of pulse modulations, dJs=mod(m², p*)−(p*−1)/2, wherein dJs are modulation values;
    calculating a list of nominal pulse timings T, as T=m× ceil($T_{PRI}/\Delta j$, where $\Delta j$ is a predetermined modulation resolution, and $T_{PRI}$ is the reciprocal of the PRF;
    calculating pulse timings $t^0$ of the cyclically optimal PPM waveform as $t^0=\Delta j\times(T+dJs)$;
    generating the cyclically optimal PPM waveform from the pulse timings $t^0$;
    transmitting the cyclically optimal PPM waveform, by the lidar toward the target to determine the range to the target; and
    receiving a waveform reflected from the target to determine the range to the target.

2. The method of claim 1, wherein the generated cyclically optimal PPM waveform is free of any baud collision.

3. The method of claim 1, wherein the ratio of a timing system bandwidth to the predetermined PRF is calculated by $$2f_j \frac{T_{PRI}}{\Delta j},$$

where $f_j$ is a hardware-constrained maximum modulation fraction.

4. The method of claim 1, wherein the list of prime numbers is obtained from a memory.

5. The method of claim 1, wherein the list of nominal pulse timings T corresponds to a transmit schedule of the lidar operating periodically.

6. The method of claim 1, wherein the list of pulse modulations comprises of available pulse modulations that are supported by the lidar.

7. A lidar for determining a range to a target by generating a cyclically optimal Pulse Position Modulated (PPM) waveform, the PPM waveform having a predetermined maximum code length and a predetermined pulse repetition frequency (PRF), comprising:
    a memory for storing a list of prime numbers up to the predetermined maximum code length;
    a processor for obtaining a list of prime numbers up to the predetermined maximum code length; selecting a largest odd prime number p* that is less than or equal to a ratio of a timing system bandwidth to the predetermined PRF, from the list of the prime numbers; constructing a list of pulse indices, m=0: p* −1 for the cyclically optimal PPM waveform; calculating a list of pulse modulations, dJs=mod(m², p*)−(p*−1)/2, wherein dJs are modulation values; calculating a list of nominal pulse timings T, as T=m×ceil($T_{PRI}/\Delta j$, where $\Delta j$ is a predetermined modulation resolution, and $T_{PRI}$ is the reciprocal of the PRF; calculating pulse timings $t^0$ of the cyclically optimal PPM waveform as $t^0=\Delta j\times(T+dJs)$; and generating the cyclically optimal PPM waveform from the pulse timings $t^0$;
    a transmitter for transmitting the cyclically optimal PPM waveform toward the target; and
    a receiver for receiving a waveform reflected from the target to determine the range to the target.

8. The lidar of claim 7, wherein the generated cyclically optimal PPM waveform is free of any baud collision.

9. The lidar of claim 7, wherein the ratio of a timing system bandwidth to the predetermined PRF is calculated by $$2f_j \frac{T_{PRI}}{\Delta j},$$

where $f_j$ is a hardware-constrained maximum modulation fraction.

10. The lidar of claim 7, wherein the list of prime numbers is generated by the processor.

11. The lidar of claim 7, wherein the list of nominal pulse timings T corresponds to a transmit schedule of the lidar operating periodically.

12. The lidar of claim 7, wherein the list of pulse modulations comprises of available pulse modulations that are supported by the lidar.

* * * * *